Aug. 28, 1962 H. E. CROCKER 3,051,492
MEMORY MARKING APPARATUS FOR THE HEAD CARRIAGE OF A PHONOGRAPH
Filed Sept. 15, 1961 2 Sheets-Sheet 1

INVENTOR.
HARRY E. CROCKER
BY
George H. Fritzinger
AGENT

Aug. 28, 1962 H. E. CROCKER 3,051,492

MEMORY MARKING APPARATUS FOR THE HEAD CARRIAGE OF A PHONOGRAPH

Filed Sept. 15, 1961 2 Sheets-Sheet 2

INVENTOR.
HARRY E. CROCKER

BY George H. Fritzinger

AGENT 3,051,492

MEMORY MARKING APPARATUS FOR THE HEAD CARRIAGE OF A PHONOGRAPH

Harry E. Crocker, Irvington, N.J., assignor to McGraw-Edison Company, Elgin, Ill., a corporation of Delaware Filed Sept. 15, 1961, Ser. No. 138,444
5 Claims. (Cl. 274—14)

This invention relates to memory marking apparatus for the traveling head of a phonograph and more particularly to a combined forward and rearward marking apparatus for the head carriage of a dictating machine.

The marking of a prior rearward position of the head carriage of a dictating machine is important for example in remotely controlled dictation recording systems as a control means for preventing one dictator from backspacing the head carriage and listening to the prior recording on the same record of another dictator as taught in the Kobler Patent No. 2,800,531, dated July 23, 1957. The marking of a prior forward position of the head carriage is important for example as a means of automatically restoring a dictating machine to record condition when after backspacing the head carriage to listen to a portion of one's recorded dictation the head carriage is returned to its prior position of farthest advance, as taught in the Logan Patent No. 2,816,177, issued December 10, 1957. The present invention relates to an improved mechanical arrangement of a combined forward and rearward marking apparatus for the head carriage of a dictating machine and is herein described and claimed without limitation to any particular application since this marking apparatus will be understood as having application in the systems described by the above patents as well as in other systems wherever a temporary marking of the prior positions of a head carriage is desired.

Objects of the invention are to provide a simple and novel apparatus for marking selected prior positions of a head carriage for a dictating machine, and especially to provide a novel form of combined rearward and forward marking apparatus for marking selectively any prior position of the head carriage while the same is advanced therefrom and any prior position of farthest advance while the carriage is backspaced therefrom.

These and other objects and features of the invention will be apparent from the following description and the appended claims.

In the description of the invention reference is had to the accompanying drawings, of which:

Figures 1, 3:
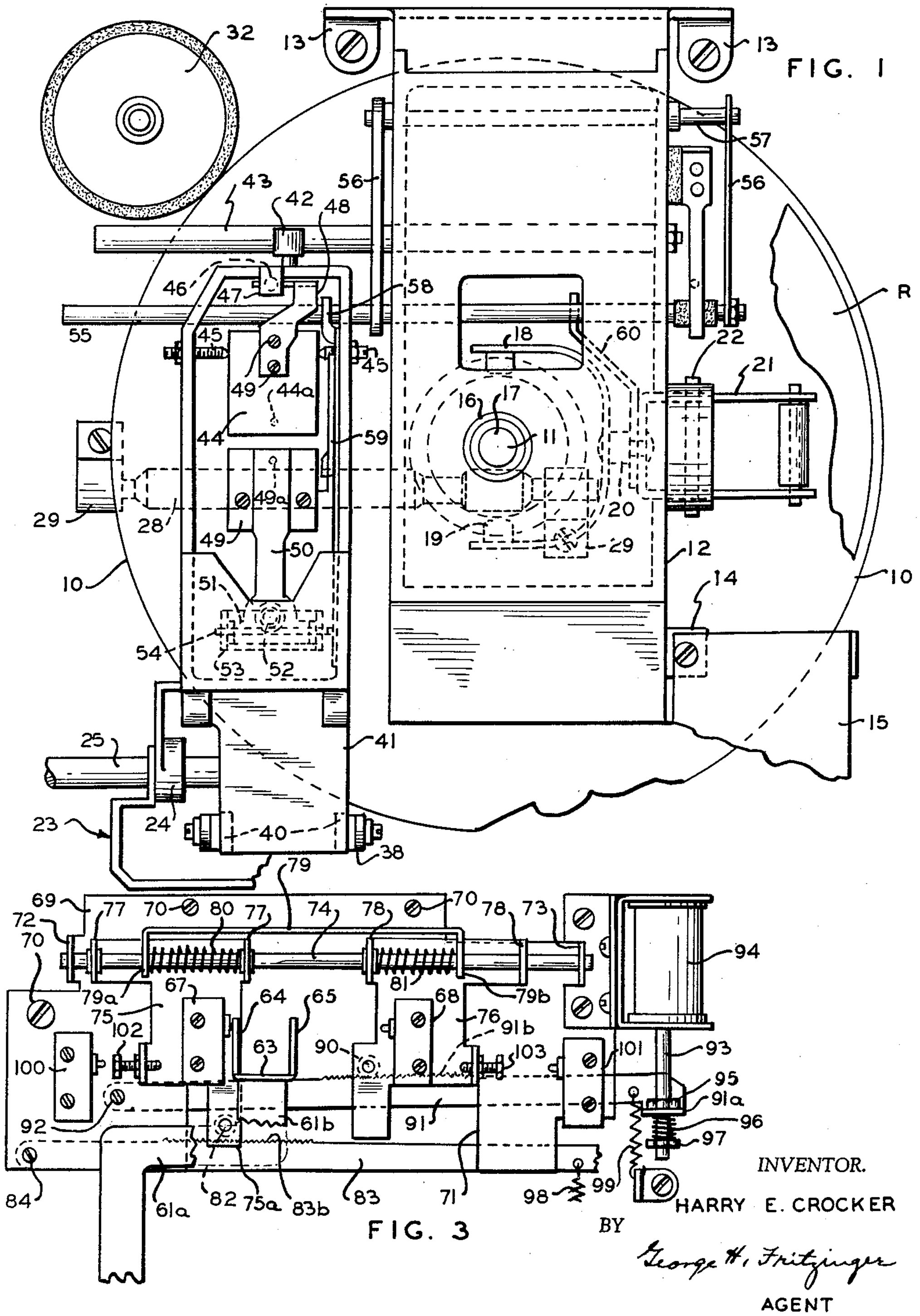
FIGURE 1 is a fractional plan view of the operating mechanism of a dictating machine in connection with which my invention is herein illustrated.
FIGURE 3 is a plan view of a portion of the marking apparatus shown in FIGURE 2 showing the forward marker operated to indicate a prior position of farthest advance of the carriage while the same is backspaced therefrom.
Figure 2:
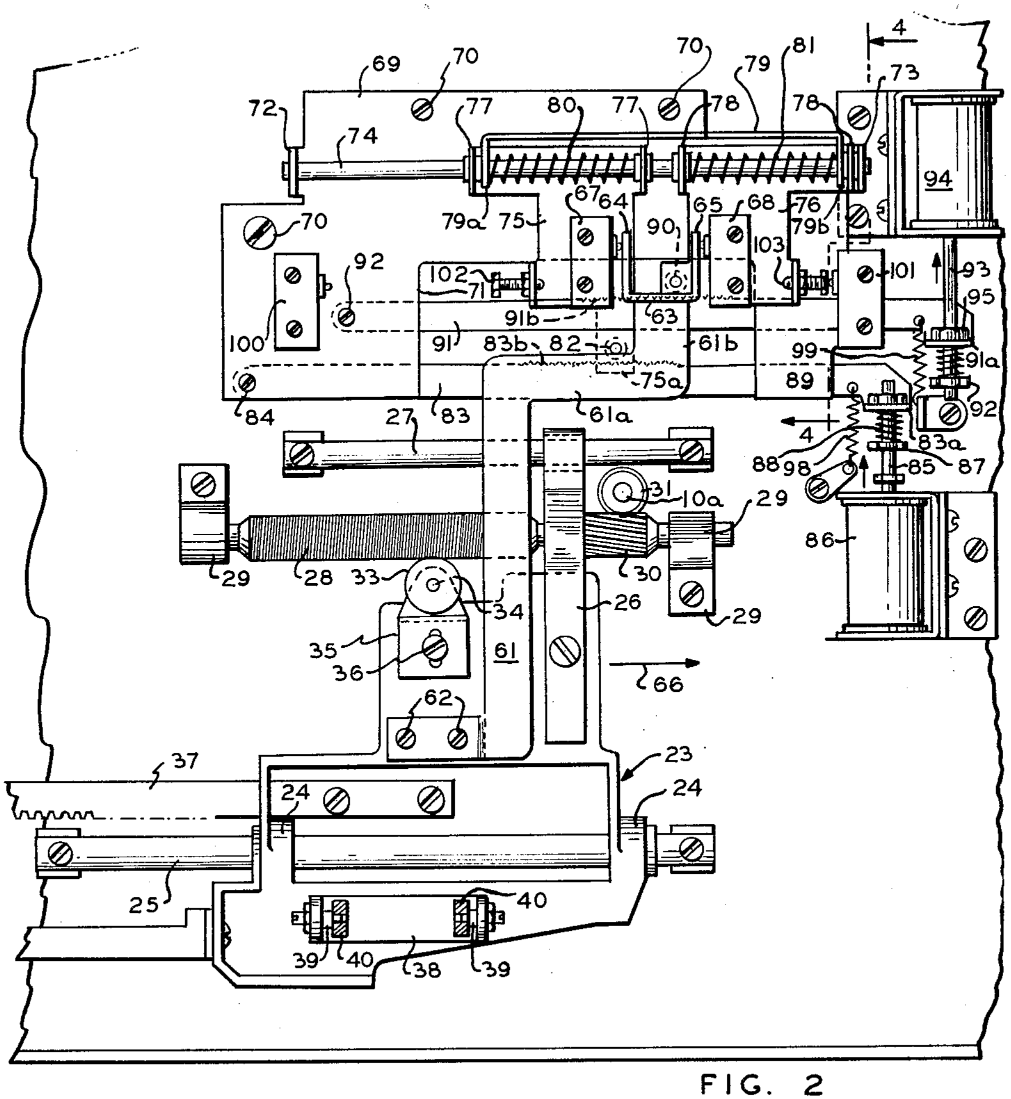
FIGURE 2 is a fractional plan view of this operating mechanism with the record supporting turntable removed to show the details of construction of the memory marking apparatus of the present invention, the marking apparatus being shown in this figure in a free condition wherein both forward and rearward marking devices are movable with the head carriage.

The present illustrative embodiment of dictating machine shown in FIGURES 1 and 2 comprises a turntable 10 journaled at its central axis 11 for supporting rotatably a flat disk record R mounted on the top face thereof. Extending almost diametrically across the top face of the turntable at a spacing therefrom is a bridge 12 having two feet 13 mounted on a supporting structure not shown at its rear end and a foot 14 at its forward end mounted on a supporting plate 15 above the turntable. This bridge is provided with a bearing 16 in axial alignment with the turntable. Journaled in this bearing is a plunger 17 which carries a record clamping disk at its lower end between the bridge and the turntable. Embracing the record clamping means is a forked member 18 having diametrically extending pins 19 engaging a peripheral groove in the record clamping means to couple the forked member thereto. This forked member is secured by a stud 20 to a U-lever 21 pivoted on a pin 22 at the right side of the bridge 12. By shifting this U-lever 21 the record clamping means is movable upwardly to clear a space for mounting a disk record on the turntable and is movable downwardly under force of a compression spring not shown to clamp the mounted record in a centered fixed relationship with the turntable.

Below the left half portion of the turntable is a sub-carriage 23 shown in FIGURE 2. This sub-carriage has two bearings 24 slidably embracing a transverse support rod 25, and has a rearwardly extending arm 26 slidably embracing a rearward support rod 27. By this supporting means the sub-carriage is movable back and forth transversely of the machine. A driven movement of the sub-carriage is obtained from a feed screw 28 supported at its ends in bearings 29 in parallel relation to the support rods 25 and 27. The feed screw 28 has a gear 30 on its right end portion meshing with a worm 31 on a shaft 10*a* of the turntable so that the feed screw is rotated at a slow speed in synchronism with the rotation of the turntable. Driving power is imparted to the turntable itself by a friction roller 32 engaging the rim of the turntable as shown in FIGURE 1, the friction roller being itself driven by a suitable motor not shown. Mounted on the rearward portion of the sub-carriage is a circular feed nut 33 in constant mesh with the feed screw 28. The circular feed nut 33 is journaled on a vertical shaft 34 and is constrained frictionally against turning about the shaft 34 by a clamp 35 adjustable to any desired pressure against the circular feed nut by a screw 36. The friction clamping of the circular feed nut is set so that the sub-carriage will be driven by the feed screw 28 as the turntable 12 is rotated but with a frictional slip coupling on the feed nut which will permit also the sub-carriage to be shifted manually in either forward or rearward directions. Such manual shifting of the sub-carriage may be made as by a rotatable pinion gear (not shown) meshing with a rack 37 extending leftwardly from the sub-carriage as shown in FIGURE 2.

Upstanding from a forward portion of the sub-carriage 23 is a U-bracket 38 carrying shouldered pivot pins 39 in the side legs thereof, which pivotally engage respective depending arms 40 of a horizontal main carriage 41 overlying the left half portion of the turntable 12. This main carriage is a rectangular structure open to the top throughout its rearward half portion. Extending from the rearward end of the main carriage is a stud on which is journaled a roller 42 which rides on a leftwardly extending support rod 43 mounted on the bridge 12. Within the rearward portion of the main carriage is a recorder 44 supported near its rearward end on cone pivots 45 which traverse the side walls of the main carriage and having a recorder stylus 44*a* depending therefrom near its forward end. The recorder 44 is biased into engagement with the record R by a tension spring 46 connected between an upper tab 47 on the rear wall of the main carriage 41 and an arm 48 secured at 49 to the recorder and extending rearwardly therefrom to a position below the tab. Positioned directly ahead of the recorder 44 is a reproducer head 49 having a reproducer stylus 49*a* depending therefrom. Secured to the reproducer head 49 is a forwardly extending arm 50 which has a universal connection to the main carriage by means comprising a gimble ring 51 to which the arm 50 is pivoted to a supporting bracket 53 on a transverse axis 54. The reproducer head 49 is weight biased against the record R.

A lift bar for the recorder and reproducer heads 44 and 49 extends transversely of the machine below the rearward portion of the main carriage 41 and in the directions of carriage movement. This left bar 55 is secured rigidly to two arms 56 one of which is at the left side of the bridge 12 and the other at the right side thereof. These arms are in turn secured rigidly at their rearward ends to a shaft 57 which traverses the bridge 12 and is journaled thereto. Thus, the lift rod 55 is supported for up and down parallel movement. This lift rod is shiftable between three positions. In its uppermost position it operates against a lift finger 58 of a coupling mechanism generally indicated at 59 and pivoted to the inside wall of the right side of the main carriage 41 to support both the recorder and reproducer heads 44 and 49 in elevated positions at a spacing above the turntable. In a next lower position of the lift bar 55 it operates through this same coupling mechanism to allow only the reproducer head 49 to engage the record, and in its lowermost position the lift rod 55 is free of the coupling mechanism 59 to permit both the recorder and reproducer heads to engage the record. The lift rod 55 is supported in its uppermost position by a left arm 60 on the lever 21 when the record clamping mechanism is held disengaged from the turntable to permit the mounting and removal of a record disk R thereon and therefrom. When the record clamp is engaged with the turntable the lift arm 60 is displaced below the lift rod 55 to allow the rod to assume its intermediate and lowermost positions. The supporting of the lift rod 55 selectively in its intermediate and lowermost positions is by suitable manual record-reproduce conditioning means not here necessary to show for the purpose of the present invention.

For a more complete description of the above dictating machine and for a further showing of the details of construction thereof reference may be had to the Somers Patent No. 2,866,647, dated April 10, 1953, and entitled Dictating Machine.

The memory marking apparatus according to my invention comprises a carriage arm 61 having a leftwardly extending member at its forward end secured at 62 to the sub-carriage 23 and extending upwardly and then rearwardly from its mounting point on the sub-carriage across the feed screw 28 and the support rod 27 whereat it is offset to the right at 61*a* and then extended further rearwardly at 61*b*. At its rearward end the arm 61 is provided with an upturned member 63 having side lugs 64 and 65 turned rearwardly therefrom and providing rearward and forward faces movable with the carriage, it being understood that a forward direction for the carriage is indicated by the arrow 66. Positioned rearwardly of the rearward lug 64 is an operable marking element in the form of a microswitch 67, and positioned forwardly of the forward lug 65 is another such marking element in the form of a microswitch 68. These marking switches have operable buttons confronting the lug 64 and 65 as shown in FIGURE 2. The mounting means for the marking switches comprise a horizontal frame plate 68 secured by screws 70 to a base structure of the machine. The frame plate has a generally rectangular shape provided however with a wide rectangular cutout or notch 71 in its forward edge and with notched left and right corners at its back side. Turned up from the plate 69 at its left and right notched corners are respective lugs 72 and 73 which are apertured to receive the ends of a cross rod 74. A mounting bracket plate 75 is provided for the marking switch 67 and another similar mounting bracket plate 76 is provided for the marking switch 68. The bracket plate 75 has apertured turned up ears 77 slidably engaging the support rod 74 and spaced from each other therealong, and similarly the mounting bracket plate 76 has apertured upturned ears 78 slidably embracing the support rod 74 to the right of the bracket plate 75. These mounting bracket plates have their forward portions resting slidably on the frame plate 69. A coupling means between these mounting bracket plates comprises a bail 79 having turned over apertured lugs at the ends slidably engaging the support rod 74 with one lug 79*a* thereof between the apertured ears 77 of the bracket plate 75 and the other lug 79*b* thereof between the ears 78 of the bracket plate 76. Positioned on the support rod 74 between the lug 79*a* and the inner ear 77 of the bracket plate 75 is a compression spring 80 and positioned between the other lug 79*b* of the bail 79 and the inner ear 78 of the bracket plate 76 is a compression spring 81. The length of the bail 79 is such that when both microswitches 67 and 68 are in abutment with the respective lugs 64 and 65 of the carriage the end lugs of the bail are in close juxtaposition to the respective outer ears 77 and 78 of the bracket plates 75 and 76 as shown in FIGURE 2. This permits the compression springs 80 and 81 to have a considerable length. By so providing relatively long compression springs with an open coil construction, as indicated, the springs have a wide latitude for compression. It is by these springs operating through the coupling bail 79 and against the inner ears 77 and 78 of the brackets 75 and 76 that the marking switches 67 and 68 are maintained normally in abutment with the back and front lugs of the carriage arm 61 to cause the marking switches to move normally in unison with the carriage. When so moved in unison with the carriage they are in an idle condition and perform no marking function.

Figure 4:
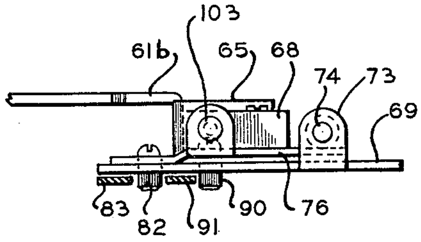
FIGURE 4 is a fractional sectional view taken on the line 4—4 of FIGURE 2.

A locking means is provided for each mounting bracket 75 and 76. The locking means for the bracket 75 comprises a knurled stud 82 extending downwardly from a forwardly extending finger 75*a* of the bracket as shown in FIGURES 2 and 4. Extending crosswise of the machine past the front of the knurled stud 82 is a locking lever 83 pivoted at 84 to the front left hand corner portion of the frame plate 69. This lever extends past the right end of the frame plate 69 and has thereat a turned up lug 83*a* which is apertured to receive a forwardly extending pin 85 on the armature of a rearward marking control solenoid 86. The pin 85 is threaded and has a nut 87 on its central portion with a compression spring 88 between the nut and the lug 83, and has an adjusting nut 89 on its outer end portion bearing against the lug 83 to effect a predetermined compression of the spring 88. The solenoid 86 is of the pusher type and operates therefore through the compression spring 88 to shift the lever 83 rearwardly about its pivot axis 84. By this shifting movement of the locking lever 83 a serrated edge 83*b* thereon is brought to bear against the knurled stud 82 to lock the bracket plate 75 in whatever position it then occupies. Once the bracket 75 is so locked it registers a definite position of the carriage while the carriage is advanced further in advance thereof. Although the marking switches are biased by the springs 80 and 81 against the respective lugs 64 and 65 the bias pressure so provided is insufficient to press the switch buttons inwardly and hold the switches operated. The marking switch 67 therefore remains unoperated not only while the switch is moved freely along with the carriage but also after the bracket 75 is locked and the carriage is moved in advance thereof. It is only after the carriage has been returned to its prior position of former advance which is occupied when the bracket 75 was locked and is then next moved through a short distance rearwardly of the position which the carriage had when the bracket 75 was locked that pressure is brought to bear against the switch button and the switch 67 is operated. By this operation of the switch the carriage drive mechanism may be disabled to prevent further rearward movement of the carriage as taught by the Kobler patent aforementioned. Also, the locking of the bracket 75 may itself form a stop to prevent the carriage from being moved manually to the rear of the position which it had, except for the slight distance to operate the switch 67, after the mounting bracket 75 is locked. Other possible control operations of the marking switch 67 will be apparent and need not be described.

The locking means for the bracket 76 carrying the forward marking switch 68 comprises a knurled stud 90 extending downwardly from a forward portion of the bracket 76 as shown in FIGURES 2 and 4. Extending transversely of the machine past the forward side of the knurled stud 90 is a locking lever 91 pivoted at 92 to the frame plate 69. This locking lever has a turned up apertured lug 91*a* at its right end traversed by a forwardly extending pin 93 of an armature of a forward marking control solenoid 94. The pin 93 is threaded and has a nut 95 on a central portion thereof against which the lug 91*a* is pressed by a compression spring 96 between the lug 91*a* and a nut 97 on the forward end of the pin. It is through this compression spring that the armature of the solenoid 94 is coupled to the locking lever 91. The solenoid 94 is of the pull type and when actuated it draws the locking lever 91 rearwardly so that a serrated edge 91*b* on a central portion thereof is brought to bear against the knurled stud 90 to lock the bracket 76 in whatever position it then occupies. Once the forward bracket 76 is so locked it will be held in that position while the carriage is moved rearwardly therefrom as indicated in FIGURE 3. The marking switch 68 then represents a prior position of farthest advance while the carriage is backspaced as for the purpose of listening back to portions of one's recorded dictation. After having so listened back to selected portions of the recorded dictation and then returning the carriage to a slight distance past its prior position of farthest advance the marking switch 68 is operated and by such operation may automatically shift the machine back to a recording condition as described for example by the forementioned Logan patent. Further, by this operation of the forward marking switch 68 the forward control marking solenoid 94 may be deenergized to permit the carriage to be moved further forwardly for continued recordation on the record R. Other control functions of the forward marking switch 68 will be apparent and need not be herein described for purposes of the present invention.

The locking levers 83 and 91 may be biased into their unoperated positions by respective tension springs 98 and 99 as shown in FIGURE 2. These tension springs serve therefore also to return the armatures of the solenoids 86 and 94 to their unoperated positions when the respective solenoids are deactivated.

End control switches 100 and 101 are mounted on the frame plate 69 in positions to be operated respectively when the carriage is in its most rearward and forward ends of travel. The end switch 100 is operable through an adjusting screw 102 on the mounting bracket 75 for the marking switch 67 and the forward end switch 101 is operable through an adjusting screw 103 on the bracket 76 for the forward marking switch 68. These adjusting screws are threaded through respective upturned apertures on the brackets and are locked in place by suitable lock nuts as shown. The end switches may control suitable warning means or perform other control functions well known in the art.

The embodiment of my invention herein particularly shown and described is intended to be illustrative and not limitative of my invention since the same is subject to changes and modifications without departure from the scope of my invention, which I endeavor to express according to the following claims.

I claim:

1. A memory marking apparatus for the traveling carriage of a phonograph comprising forward and rearward marking devices mounted for movement with said carriage, spring biasing means movable with said carriage for urging said marking devices respectively against forward and rearward faces on the carriage whereby the marking devices are normally conditoned to move in unison with the carriage, shiftable operating members respectively operatively interposed between said marking devices and carriage, said operating members being biased to non-operated positions with forces substantially greater than the forces transmitted thereto by said biasing means, respective marking switches operable by shifting movement of said operating members, and respective means for locking said marking devices to cause said forward marking device when locked to define a prior position of farthest advance of the carriage while the carriage is moved rearwardly therefrom against the force of said biasing means and said forward marking switch to be operated when the carriage is moved in advance of said prior position of farthest advance, and to cause said rearward marking device when locked to define a prior position of advance while the carriage is moved forwardly therefrom against the force of said biasing means and said rearward marking switch to be operated when the carriage is moved rearwardly from said prior position of advance.

2. The memory marking apparatus set forth in claim 1 wherein said respective locking means comprise respective racks extending along the paths of movement of said marking devices, and respective electromagnetic means activatable individually to shift said racks into engagement with the respective marking devices.

3. A memory marking apparatus for the traveling carriage of a phonograph comprising means supporting the carriage for rectilinear movement, a guide rod parallel to the path of movement of the carriage, an arm on said carriage normal to and movable in a path along said guide rod, forward and rearward marking switches at the front and back sides of said arm, respective means mounting said marking switches for movement along said guide rod including respective mounting members slidably engaging said rod, a bail slidable on said guide rod and embracing said mounting members, compression springs on said rod respectively interposed between said mounting members and the corresponding ends of said bail for biasing said marking switches against said carriage arm, said switches being mounted for operation by movement against the carriage and being biased to unoperated positions by forces substantially greater than the forces transmitted thereto by said compression springs, and respective means operable to lock said marking switches individually in any position in their paths of travel whereby upon moving said carriage forwardly past its prior position of farthest advance which it had when said forward marking switch was locked said forward marking switch is operated and upon moving said carriage rearwardly past its prior position of advance which it had when said rearward marking switch was locked said rearward marking switch is operated.

4. A memory marking apparatus for the traveling carriage of a phonograph comprising means supporting the carriage for rectilinear movement, a guide rod parallel to the path of movement of the carriage, forward and rearward marking devices at front and back sides of the carriage, individual bails slidable on said guide rod for guiding said marking devices, a coupling bail on said guide rod having its apertured ends slidable on said guide rod within said respective mounting bails, respective compression springs on said guide rod between the ends of said coupling bail and the respective adjacent ends of said mounting bails for urging said marking devices towards one another against said front and back sides of said carriage, operable control members operatively interposed between said respective marking devices and said carriage, said control members being biased to unoperated positions with forces substantially greater than the forces exerted thereon by said compression springs, and respective means for locking said marking devices whereby upon locking the forward marking device and thereafter moving the carriage forwardly past the position occupied by the marking device when the same was locked said forward marking control member is operated and upon locking the rearward marking device and thereafter moving the carriage rearwardly past the position occupied thereby when the rearward marking device was locked said rearward marking control member is operated.

5. A memory marking apparatus for the traveling carriage of a phonograph comprising means mounting said carriage for rectilinear movement, a guide rod mounted parallel to the path of movement of said carriage, an arm on said carriage normal to and movable along said guide rod, forward and rearward marking switches at the front and back sides of said carriage arm having spring biased switch operating members confronting the front and back sides of said arm and operable by pressure of the marking switches thereagainst, mounting brackets for said switches having bail portions with spaced apertured lugs slidably engaging said guide rod at positions along the guide rod, an intercoupling bail having one apertured lug on said guide rod between the apertured lugs of one of said brackets and another apertured lug on said guide rod between the apertured lugs of the other of said brackets, the length of said intercoupling bail being such that the ends thereof are adjacent the outermost lugs of said respective brackets when the marking switches are in contact with the front and back sides of said carriage arm, compression springs on said guide rod between the end lugs of said intercoupling bail and the inner lugs of said respective brackets for pressing said switches toward one another into contact with the front and back sides of said carriage arm to cause said marking switches to tend to be moved normally in unison with said carriage, the pressure of said marking switches against said carriage arm from said compression springs being insufficient to operate said switches, and respective rack members extending along the path of said brackets and movable independently in directions towards and away from the respective brackets for selectively locking the brackets whereby when said forward bracket is locked said carriage is movable rearwardly from its prior position of farthest advance with equal compression of said compression springs and is movable forwardly of said position to operate said forward marking switch and whereby when said rearward bracket is locked said carriage is movable forwardly in advance of the previous position of advance with equal compression of both of said compression springs and is movable rearwardly of said previous position to operate said rearward marking switch.

No references cited.